United States Patent [19]
Goldberg

[11] 3,780,725
[45] Dec. 25, 1973

[54] FETAL HEARTBEAT MONITORING SYSTEM WITH PLURAL TRANSDUCERS IN ONE PLANE AND AT DIFFERENT ANGLES THERETO

[75] Inventor: Paul R. Goldberg, East Palo Alto, Calif.

[73] Assignee: Smith Kline Instruments, Inc., Palo Alto, Calif.

[22] Filed: Mar. 4, 1971

[21] Appl. No.: 120,970

[52] U.S. Cl............................ 128/2.05 T, 128/2.05 Z
[51] Int. Cl............................................. A61b 5/02
[58] Field of Search....................... 128/2 V, 2.05 A, 128/2.05 F, 2.05 M, 2.05 Q, 2.05 R, 2.05 S, 2.05 T, 2.05 Z, 24 A

[56] References Cited
UNITED STATES PATENTS

| | | | |
|---|---|---|---|
| 3,561,430 | 2/1971 | Filler, Jr. et al. | 128/2.05 R |
| 3,237,623 | 3/1966 | Gordon | 128/24 A |
| 3,283,181 | 11/1966 | Johanson | 128/2.05 S |
| 3,577,772 | 5/1971 | Perilha et al. | 128/2 V |
| 3,587,561 | 6/1971 | Ziedonis | 128/2.05 R |

Primary Examiner—William E. Kamm
Attorney—Flehr, Hohbach, Test, Albritton & Herbert

[57] ABSTRACT

Fetal heartbeat monitoring system in which a plurality of ultrasonic beams are transmitted at different angles into the uterus of an expectant mother. A plurality of receiving transducers are inclined at different angles for receiving the signal as it is reflected from the fetus and/or uterus walls, the frequency of the reflected signal differing from that of the transmitted signal by an amount corresponding to the rate of the fetal heart motion. A system of rate computation from the resultant doppler fetal heart motion signal is employed which utilizes frequency domain techniques. The heart rate signal is extracted from the doppler heart motion signal by means of a diode demodulator and low frequency band pass filter.

5 Claims, 13 Drawing Figures

INVENTOR.
PAUL R. GOLDBERG

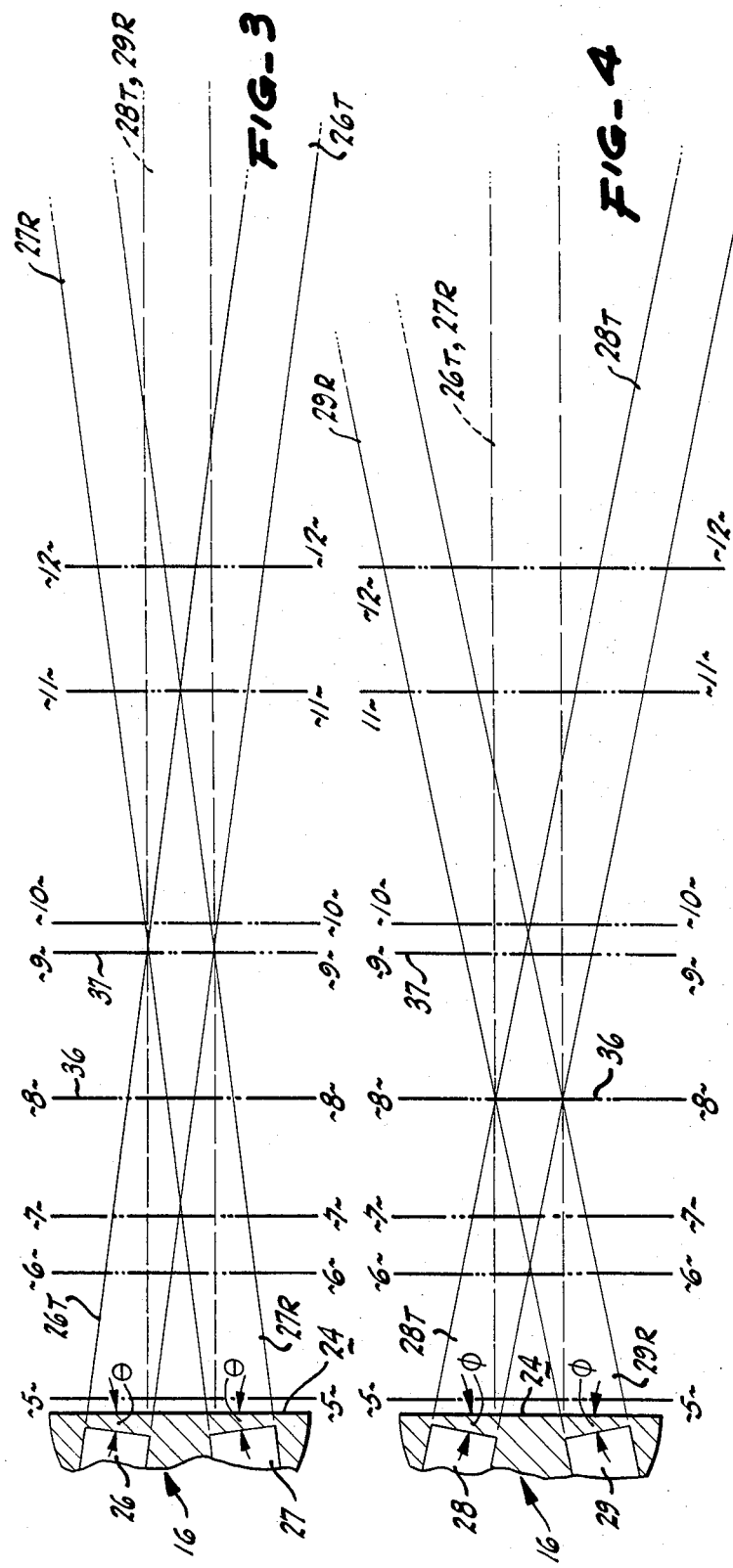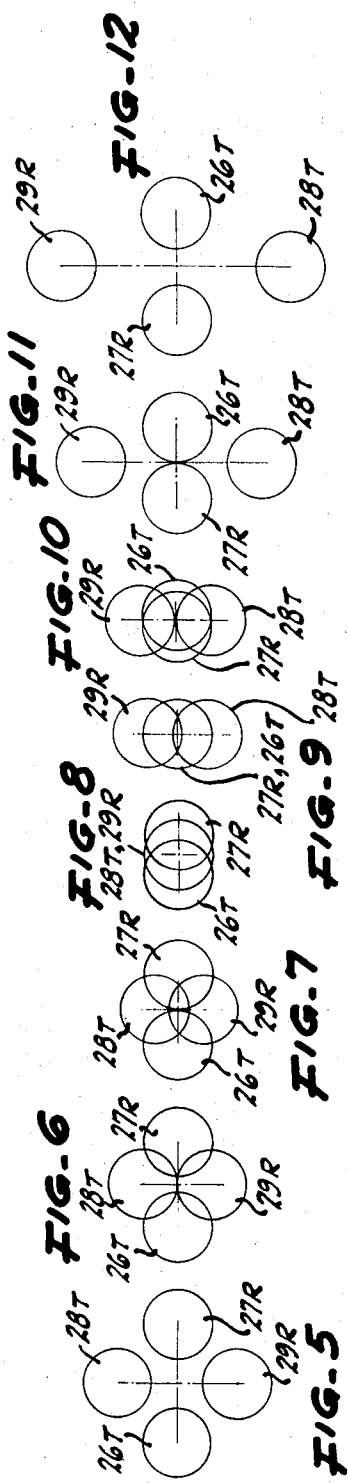
INVENTOR.
PAUL R. GOLDBERG

FETAL HEARTBEAT MONITORING SYSTEM WITH PLURAL TRANSDUCERS IN ONE PLANE AND AT DIFFERENT ANGLES THERETO

BACKGROUND OF THE INVENTION

This invention pertains generally to systems and methods for monitoring fetal heartbeats and more particularly to a fetal heartbeat detector ultilizing ultrasonics and the Doppler principle.

In recent years, members of the medical profession have recognized the desirability of being able to monitor the heartbeat of a fetus without invasion of the mother's body. Such monitoring is particularly valuable since it provides an early warning of disorders such as fetal anoxia which are often characterized by an erratic fetal heartbeat. If undetected, such disorders can cause death or brain damage to the fetus.

Heretofore, a few systems using ultrasonic energy and the Doppler principle have been proposed for monitoring the fetal heartbeat. In such systems, a transducer passes an ultrasonic beam into the uterus of the expectant mother where it is reflected back to the transducer. Because of the Doppler principle, the frequency of the reflected beam differs from that of the transmitted beam by an amount corresponding to the fetal heart rate motion.

A problem exists with the fetal heart monitors heretofore provided since they are not capable of tracking fetal heart tones for extended periods of time without repositioning of the transducer to avoid loss of fetal heart signal. Various attempts have been made in the prior systems to spread the ultrasonic beam in order to overcome this problem. These attempts have included focusing methods, multitransducer configurations, and multibeam transducers focused at the same point. None of these efforts has been wholly successful.

Another problem encountered with fetal heart monitoring systems of the prior art is a lack of a consistent means of heart rate computation. Heretofore, it was not possible to accurately count the fetal heart rate over long periods of time because of the great variation in fetal heart tone quality. Methods employing threshold levels, timing gates, integration and differentiation techniques have been tried with only partial success.

There is, therefore, a need for a new and improved fetal heart monitoring system and method which overcome the foregoing and other disadvantages of the systems heretofore provided.

SUMMARY AND OBJECTS OF THE INVENTION

The fetal heartbeat monitoring system of the present invention includes a transducer for transmitting and receiving a plurality of ultrasonic beams. The transmitting and receiving elements in this tranducer are inclined at different angles to provide overlapping beams of different focal lengths. This, in effect, produces a resultant beam having a focal range extending between the longest and shortest of the focal lengths of the individual beams. This allows the transducer to cover a relatively large volume within the uterus. A rate computation system using frequency domain techniques is provided for changing the fetal heart tones to a signal which describes the fetal heart rate at any given instant. This type of rate computer has been found to provide a significant improvement in reliability and ease of use over time domain techniques used in the past.

It is in general an object of the present invention to provide a new and improved fetal heart monitoring system.

Another object of the invention is to provide a system of the above character utilizing ultrasonic and the Doppler principle.

Another object of the invention is to provide a system of the above character in which a plurality of overlapping ultrasonic beams of different focal lengths are transmitted into and received from the uterus to provide coverage of a relatively large volume.

Another object of the invention is to provide a system of the above character which includes a frequency rate computation system.

Additional objects and features of the invention will be apparent from the following description in which the preferred embodiment is set forth in detail in conjunction with the accompanying drawings.

BRIEF DESCRIPTION OF THE DRAWINGS

FIG. 3 is a sectional view of a portion of the transducer, illustrating the overlapping beam patterns produced by a pair of transducer elements inclined at a first predetermined angle.

FIG. 4 is another sectional view, taken in a direction normal to that of FIG. 3, of the transducer, illustrating the overlapping beam patterns produced by a pair of transducer elements inclined at a second predetermined angle.

FIG. 5 is a cross-sectional view taken along line 5—5 in FIG. 4.

FIG. 6 is a cross-sectional view taken along line 6—6 in FIG. 4.

FIG. 7 is a cross-sectional view taken along line 7—7 in FIG. 4.

FIG. 8 is a cross-sectional view taken along line 8—8 in FIG. 4.

FIG. 9 is a cross-sectional view taken along line 9—9 in FIG. 4. FIG. 10 is a cross-sectional view taken along line 10—10 in FIG. 4.

FIG. 11 is a cross-sectional view taken along line 11—11 in FIG. 4.

FIG. 12 is a cross-sectional view taken along line 12—12 in FIG. 4.

DESCRIPTION OF THE PREFERRED EMBODIMENT

Figure 1:
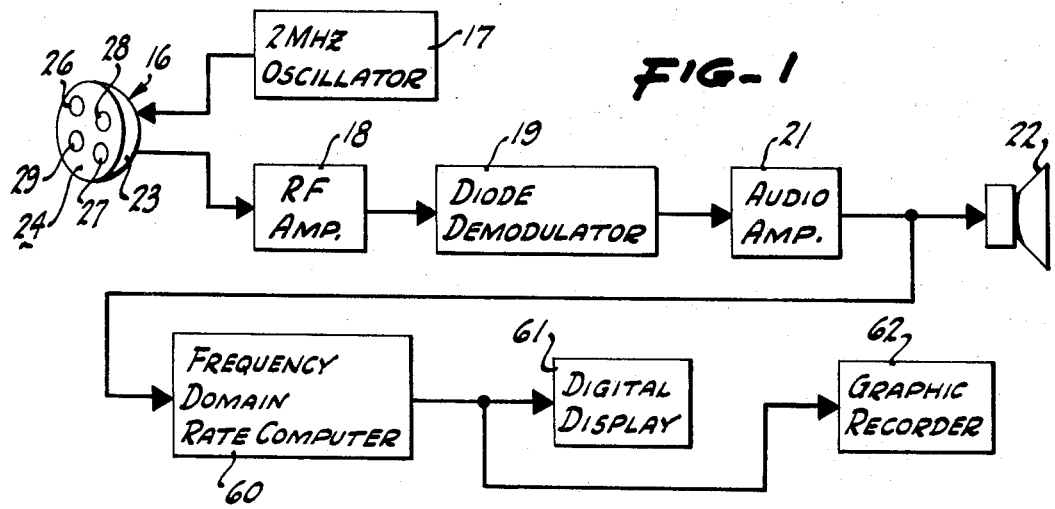
FIG. 1 is a block diagram of one embodiment of a fetal heart monitoring system incorporating the present invention.

The fetal heartbeat detector system of the present invention includes a transducer head 16, a signal generator or oscillator 17, a radio frequency amplifier 18, a diode demodulator 19, an audio amplifier 21, a speaker 22, a frequency domain rate computer 60, and display devices 61 and 62.

The transducer head 16 includes a body 23 fabricated of a rigid material, such as epoxy, which is formed to include a generally planar surface 24 for placement on the outer abdominal wall of an expectant mother. The transducer head also includes a plurality of transmitting and receiving crystals which are inclined relative to the surface 24 in a manner described hereinafter in detail. In the embodiment illustrated in the drawings, four such crystals are provided, and these are disposed in diametrically opposed pairs. The first of these pairs includes a transmitting crystal 26 and a receiving crystal 27, and the second pair includes a transmitting crystal 28 and a receiving crystal 29. The transmitting crystals 26, 28 are connected to the output of the signal generator or oscillator 17, and the receiving crystals 27, 29 are connected to the input of the radio frequency amplifier 18.

The oscillator 17 and RF amplifier 18 are of conventional design. In the presently preferred embodiment, the oscillator produces a sign wave having a frequency on the order of 2.00 megahertz, and the RF amplifier has a pass band centered about this frequency. The RF amplifier is operated in a linear condition. The signal received by the receiving crystals 27, 29 and applied to the RF amplifier differs in frequency from the signal produced by the oscillator by an amount corresponding to the rate of movement of the fetal heart. The output of the RF amplifier is connected to the input of the diode demodulator 19 which provides means for removing the beat frequencies produced by the mixing of the frequency shifted signal reflected from the fetal heart and the transmitter oscillator signal at the transducer, maternal interface. The output of the diode demodulator is connected to the input of a conventional audio amplifier, and the output of this amplifier is applied to a speaker 22, the frequency domain rate computer 60, and the display devices 61, 62.

Figure 2:
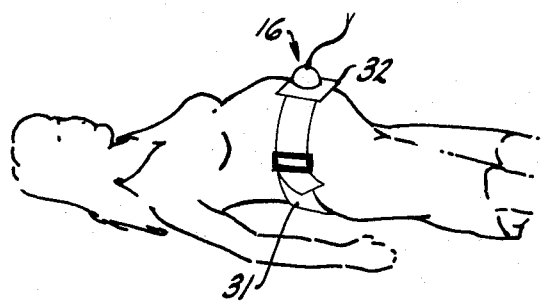
FIG. 2 illustrates the transducer of the system shown in FIG. 1 placed on the abdomen of an expectant mother.

FIG. 2 illustrates one embodiment of a strap assembly for positioning the transducer head 16 on the outer abdominal wall of an expectant mother. This assembly includes an adjustable belt or strap 31 for passing around the body of the mother and an adjustable gimbal bracket 32 for holding the planar surface of the transducer head against the outer abdominal wall. Since the gimbal bracket is adjustable, the planar surface of the transducer head can be moved to any desired angle relative to the abdominal wall without disturbing the remainder of the strap assembly.

The transmitting and receiving crystals 26, 27 are inclined relative to the planar surface 24 of the transducer head by an angle $\theta$ which in the preferred embodiment has magnitude on the order of 4°. The crystals 28, 29 are inclined relative to the planar surface by an angle $\phi$ having a magnitude on the order of 6°. The beam patterns produced by the transmitting and receiving crystals are illustrated in FIGS. 3-12, with the beams produced by the crystals 26 and 27 being designated by the reference numerals 26T and 27R, respectively and the beams produced by the crystals 28 and 29 designated by the reference numerals 28T and 29R, respectively. While the beams are illustrated as having circular cross sections, they may have any other desired shape, this shape being determined by the shape of the crystals.

As the distance from the planar surface 34 increases, the beams 26T-29R converge, cross over, and then diverge from each other. The beams 28T and 29R cross over in a plane 36, producing a first focus. The cross-sectional view 8—8 is taken along this plane and illustrates the first cross-over point. The beams 26T, 27R cross over in a plane 37 to produce a second focus. The cross-sectional view 9—9 is taken through the plane 37. With the crystals inclined at angles on the order of 4 and 6 degrees, the plane 36 is spaced from the planar surface 24 by a distance on the order of 16 centimeters, and the plane 37 is spaced a distance on the order of 24 centimeters from this surface. These distances would be somewhat less but for a slight defraction which is produced by the epoxy which covers the crystals.

The beams 26T-29R are not well defined, and therefore the two foci merge into each other, producing an elongated focus which extends from less than 16 centimeters to more than 24 centimeters. Also, it should be noted that the beams 26T-29R overlap and cross each other in more than the two planes 36, 37 thus enabling the transducer to be sensitive to a relatively large volume within the uterus.

While the presently preferred embodiment of the invention utilizes two pairs of transmitting and receiving crystals, other numbers of crystals can be used to provide the elongated focus effect. Thus, for example, three crystals would likewise produce satisfactory results in the system. Similarly, the 4° and 6° angles are not critical, and other angles can be used if desired.

Figure 13:
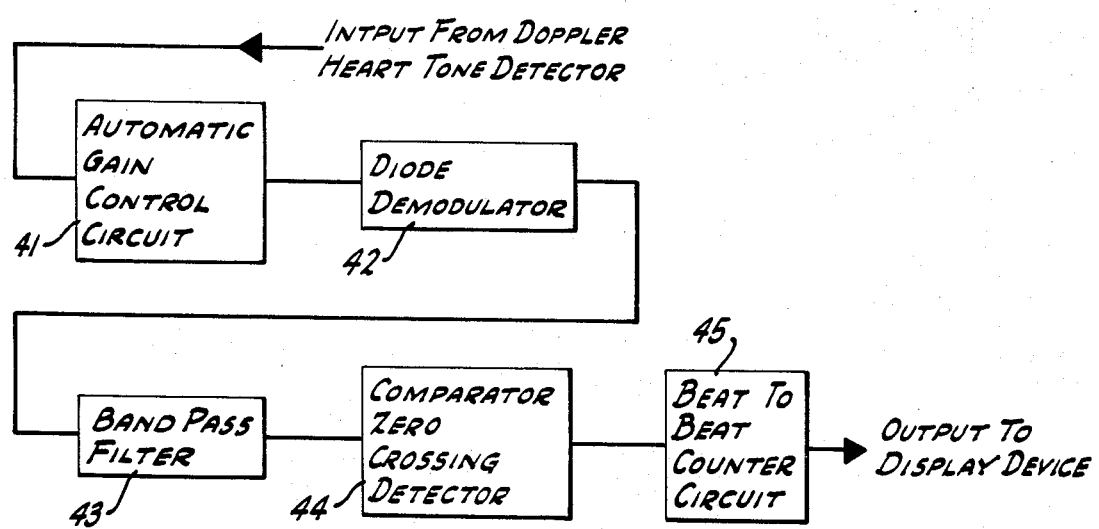
FIG. 13 is a block diagram of one embodiment of a frequency domain rate computation circuit which can be used in the system illustrated in FIG. 1.

The frequency domain rate meter illustrated in FIG. 13 includes an automatic gain control circuit 41, whose gain is controlled by the amplitude of the incoming fetal heart sound signal emanating from the doppler fetal heart tone detector. Following this circuit appears a frequency translation system comprising a diode demodulator 42, which half wave rectifies the amplitude stabilized doppler heart tone signal, and translates the frequency components of this signal such that they appear around a 0 Hz center frequency, rather than around a fundamental frequency that may vary between 150 Hz to 1500 Hz. A 1.12 Hz to 3.25 Hz low frequency band pass filter, 43, removes all the associated upper side bands of the demodulated fetal heart tone signal and passes only the first side band, the fetal heart rate component. This signal is fed to a zero crossing detector 44, which produces a pulse for every cycle. In order to translate this pulsed information to a DC level to drive a digital voltmeter and/or a graphic strip chart recorder, a beat-to-beat counter 45, is provided. This device functions as a pulse to DC level counter, translating, on an instantaneous basis, the pulsed information to a voltage amplitude which is directly proportional to the fetal heart rate frequency. The output of the system is in units of beats per minute.

Operation and use of the fetal heart beat monitoring system can now be described briefly. Let it be assumed that the transducer head 16 has been placed on the outer abdominal wall of the expectant mother in the manner illustrated in FIG. 2. Ultrasonic or RF energy having a frequency on the order of 2 Megahertz is emitted into the uterus or womb of the expectant mother through the transmitting crystals 26, 28. This energy is reflected off the fetus and the walls of the uterus and is returned to the receiving crystals 27, 29 at a frequency differing from the oscillator frequency by an amount corresponding to the velocity of the fetal heart motion. The received signal is amplified by the RF amplifier and applied to the diode demodulator 19. The output of the diode demodulator is a signal having a frequency corresponding to the frequency of the fetal heartbeat and a magnitude corresponding to the strength of the heartbeat. This signal is amplified in the audio amplifier 21 and applied to the speaker 22 and frequency domain rate meter 60, where the heart rate is extracted and displayed in the form of a line on a graph or as a direct reading digital output.

The method of the present invention should be apparent from the foregoing description of the apparatus. Briefly, this method can be summarized as including the steps of transmitting a signal having a predetermined frequency into the womb of an expectant mother in such manner that the signal is reflected by the fetal heart, the reflected signal having a frequency differing from the transmitted signal by an amount corresponding to the rate of the fetal heart movement, receiving the reflected signal, and comparing the frequency of the received signal with that of the transmitted signal to determine a doppler heart tone signal which is subsequently impressed on a rate computer of unique embodiment in order to extract the fetal heart rate from this conglomerate signal. The signals are transmitted and received by a plurality of transducer elements inclined at different angles relative to the outer abdominal wall of the expectant mother.

From the foregoing, it is apparent that a new and improved method and apparatus have been provided for monitoring fetal heartbeats. This system makes it possible to track such heartbeats for extended periods of time, and it has been found to provide reliable tracking for periods in excess of twelve hours without need for repositioning the transducer head. The signal tracked does not have to come directly from the perticardium of the fetal heart, but can come from other sources such as the heart valves or the flow of fetal blood across the placenta. While only one presently preferred embodiment of the invention has been described herein, as will be apparent to those familiar with the art, certain changes and modifications can be made without departing from the scope of the invention as defined by the following claims.

I claim:

1. In a system for monitoring the heart-beat of a fetus in the womb of an expectant mother, a transducer assembly including a generally planar surface, strap means for holding the assembly in a predetermined position on the outer abdominal wall of an expectant mother, said transducer assembly including a plurality of transducer elements mounted in a single plane and inclined at predetermined angles relative to the generally planar surface for transmitting energy into the womb of the expectant mother and receiving energy reflected from within the womb in discrete beams, said beams intersecting each other in an elongated region extending along an axis normal to the planar surface, the reflected energy having a fetal heart rate component which differs in frequency from the transmitted energy by an amount corresponding to the rate of fetal heart movement, signal generating means connected to some of said transducer elements, and means connected to others of said transducer elements for processing signals received thereby to recover the fetal heart rate component of said signals.

2. A system as in claim 1 wherein said transducer elements are provided in pairs, each of said pairs including one transmitting element and one receiving element, the elements in different pairs being inclined at different angles relative to said generally planar surface so that the beams associated with different pairs intersect along the axis at different distances from the generally planar surface.

3. A system as in claim 1 together with means for converting the fetal heart rate component to an analog signal.

4. A system as in claim 1 together wih controlled gain amplifier means for amplifying the reflected signal.

5. A system as in claim 1 wherein the means for processing the received signals includes means for translating the frequency of the reflected signal so that said signal has a predetermined center frequency, bandpass filter means for separating the fetal heart rate component from the remainder of the frequency translated signal, and means for converting the fetal heart rate component to a pulsating signal.

* * * * *